United States Patent [19]
Chen

[11] Patent Number: 5,603,480
[45] Date of Patent: Feb. 18, 1997

[54] KEYBOARD STAND MOUNTING STRUCTURE

[75] Inventor: Frank Chen, Taipei, Taiwan

[73] Assignee: Silitek Corporation, Taipei, Taiwan

[21] Appl. No.: 434,186

[22] Filed: May 3, 1995

[51] Int. Cl.$^6$ .................................................. F16F 15/00
[52] U.S. Cl. ........................... 248/688; 248/685; 248/918
[58] Field of Search .................................... 248/685, 686, 248/688, 918; 312/223.2

[56] References Cited

U.S. PATENT DOCUMENTS

| | | | |
|---|---|---|---|
| 4,856,748 | 8/1989 | Obermeyer | 248/688 |
| 5,188,321 | 2/1993 | Hirschenson et al. | 248/918 X |
| 5,273,250 | 12/1993 | Pemberton et al. | 248/918 X |
| 5,297,003 | 3/1994 | Nomura et al. | 248/685 X |
| 5,437,235 | 8/1995 | Randolph | 312/223.3 X |
| 5,483,898 | 1/1996 | Seidl | 248/918 X |
| 5,513,579 | 5/1996 | Allan | 248/918 X |

*Primary Examiner*—Carl D. Friedman
*Assistant Examiner*—Beth Aubrey
*Attorney, Agent, or Firm*—Browdy and Neimark

[57] ABSTRACT

A keyboard stand mounting structure including a keyboard shell, which a big recessed hole at the back side and two small recessed hole spaced by the big recessed hole, two small stands respectively pivoted to the back side of the keyboard shell and turned between the collapsed position received in the small recessed hole and the operative position to support the keyboard shell in a first tilted position, and a big stand pivoted to the back side of the keyboard shell and turned between the collapsed position received in the big recessed hole and the operative position to support the keyboard in a second tilted position.

1 Claim, 5 Drawing Sheets

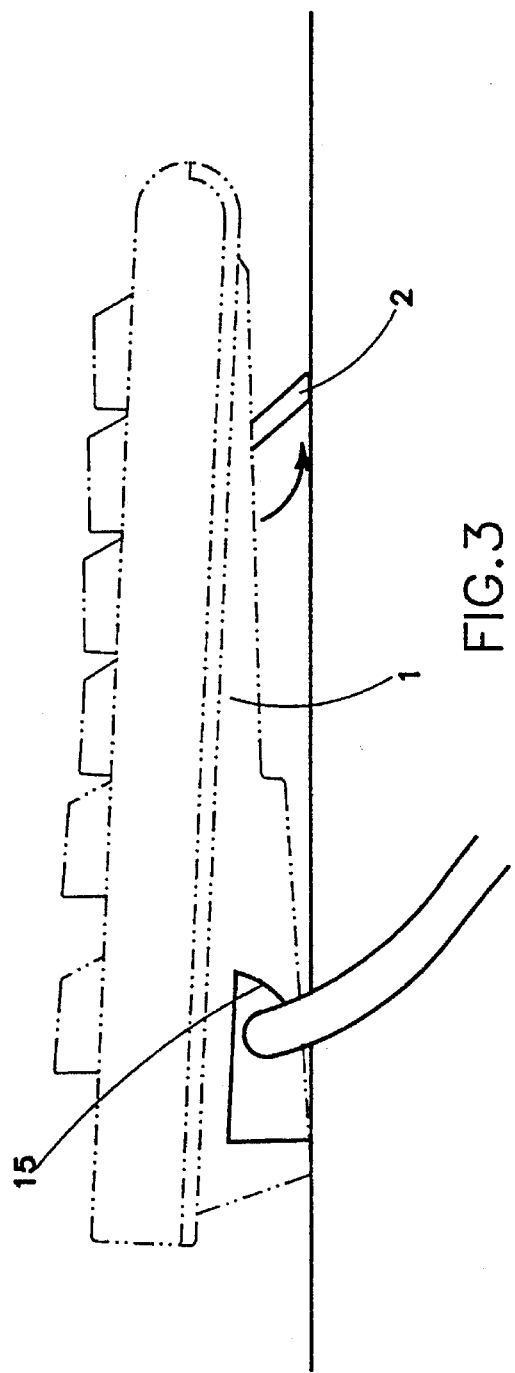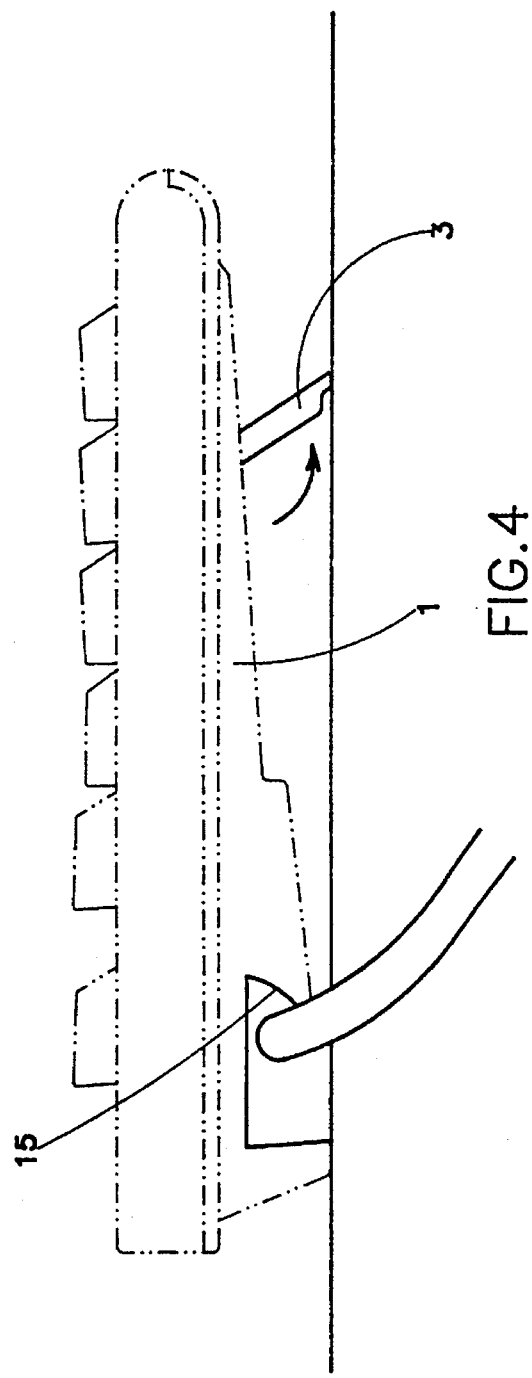

5,603,480

KEYBOARD STAND MOUNTING STRUCTURE

BACKGROUND OF THE INVENTION

The present invention relates to keyboard stands, and relates more particularly to a keyboard stand mounting structure which includes a big stand and two small stands for alternatively supporting the keyboard shell in different tilted positions.

Regular keyboards generally have two small stands pivotably disposed at the back side. The stands can be turned between the collapsed position received in a respective recess on the keyboard shell and the operative position to support the keyboard shell in a tilted position. Because the keyboard can only be supported in one tilted position, it cannot satisfy different requirements.

SUMMARY OF THE INVENTION

The present invention has been accomplished to provide a keyboard stand mounting structure which comprises a big stand and two small stands for alternatively supporting the keyboard shell in different tilted positions. According to the preferred embodiment of the present invention, the keyboard stand mounting structure comprises a keyboard shell, with a big recessed hole at the back side and two small recessed hole spaced by the big recessed hole, two small stands respectively pivoted to the back side of the keyboard shell and turned between the collapsed position received in the small recessed hole and the operative position to support the keyboard shell in a first tilted position, and a big stand pivoted to the back side of the keyboard shell and turned between the collapsed position received in the big recessed hole and the operative position to support the keyboard in a second tilted position.

BRIEF DESCRIPTION OF THE DRAWINGS

FIG. 3 is a side plain view showing the keyboard shell supported by the small stands in the first tilted position;

FIG. 4 is another side plain view showing the keyboard shell supported by the big stand in the second tilted position.

DETAILED DESCRIPTION OF THE PREFERRED EMBODIMENT

Figure 1:
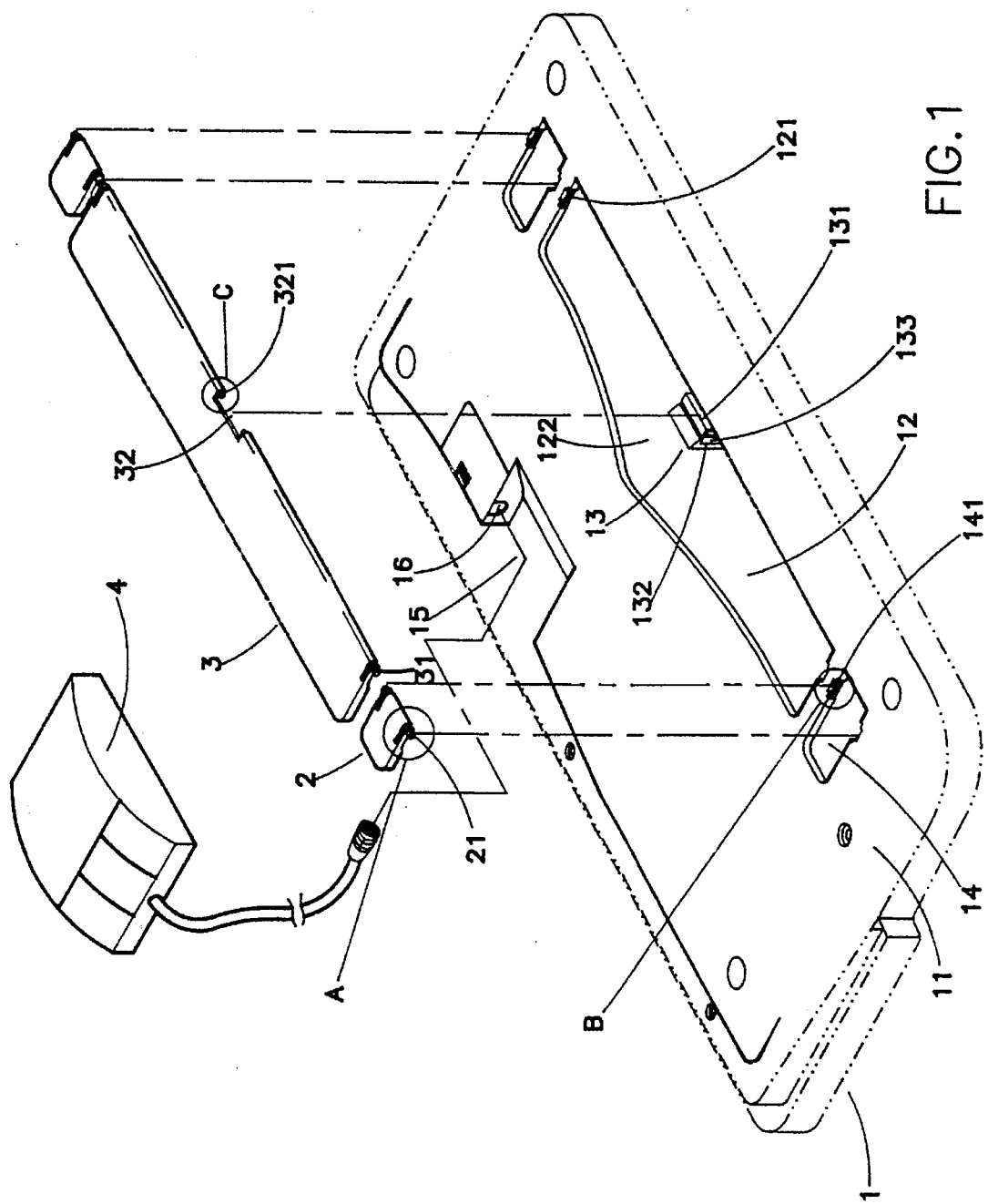
FIG. 1 is an exploded view of the keyboard stand mounting structure according to the present invention.
Figure 1C:
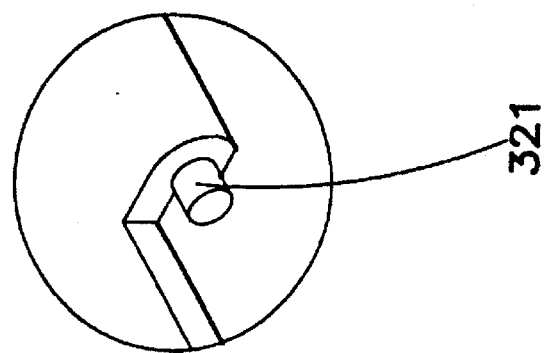
FIG. 1C is an enlarged view taken on part C of FIG. 1.
Figure 1B:
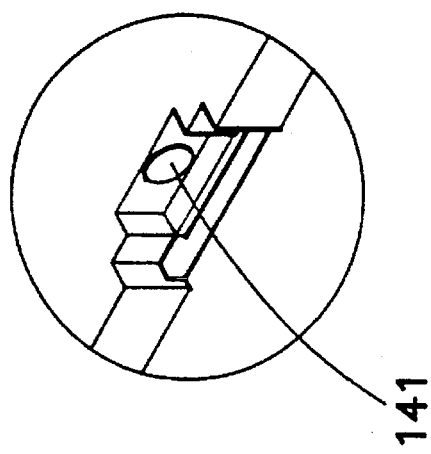
Fig. 1B is an enlarged view taken on part B of FIG. 1.
Figure 1A:
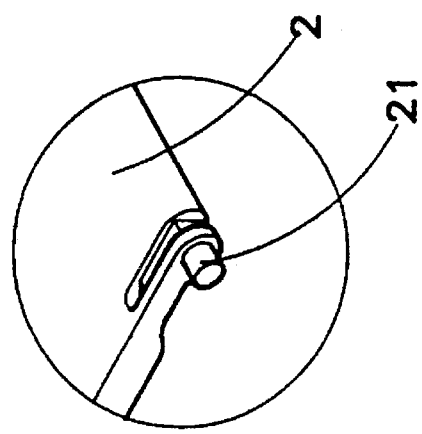
FIG. 1A is an enlarged view taken on part A of FIG. 1.
Figure 2:
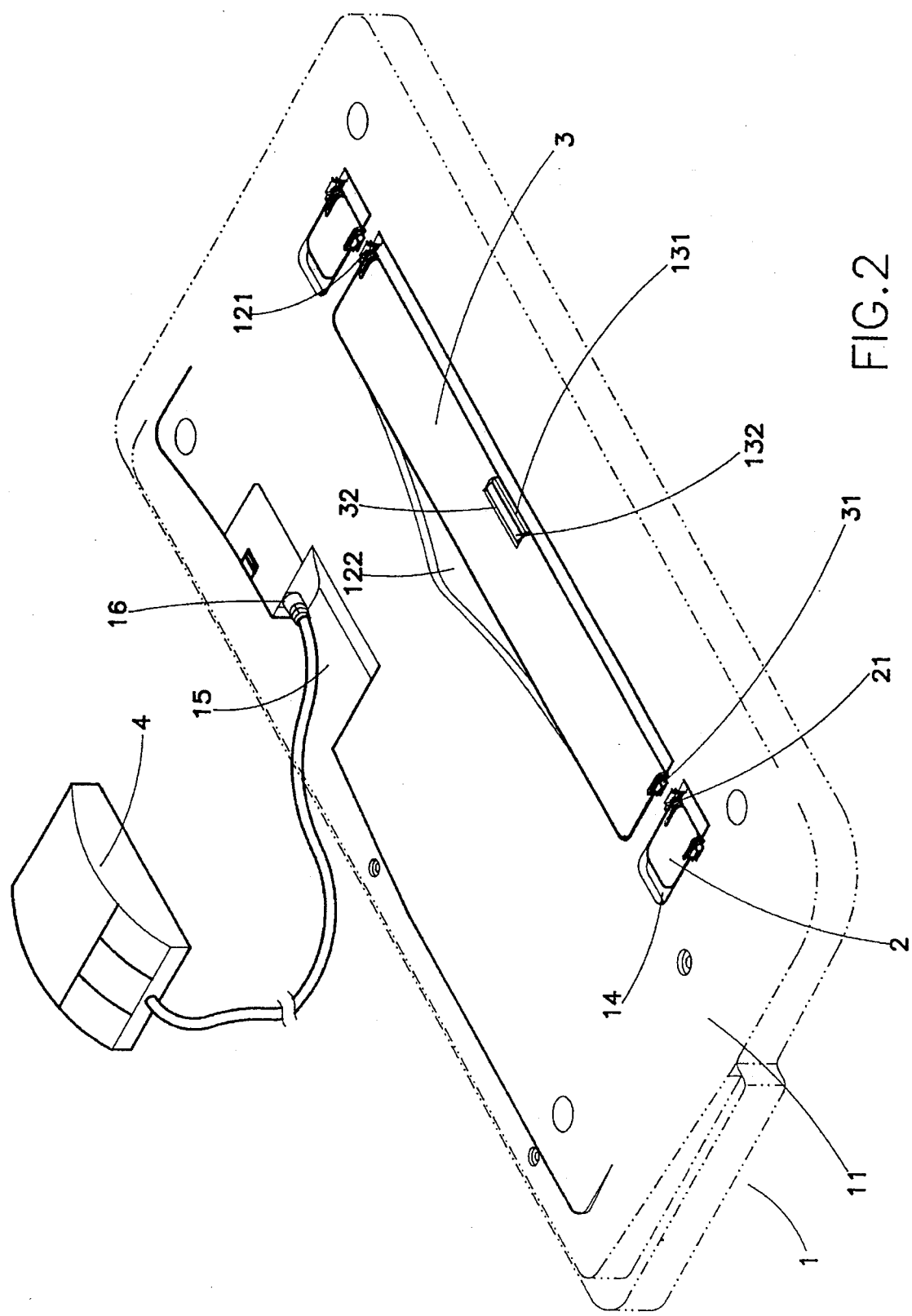
FIG. 2 is an assembly view of FIG. 1.

Referring to FIGS. 1, 1A, 1B, 1C, and 2, the present invention is generally comprised of a keyboard shell 1, a big stand 3, and two small stands 2. The bottom side 11 of the keyboard shell 1 has a big recessed hole 12 longitudinally disposed near one long side of shell 1 for receiving the big stand 3, two pivot holes 121 in the elongated recessed hole 12 at two opposite ends, a sloping recess to permit access to a side of stand 3 extending 122 backwards upwardly extended from one side of the big recessed hole 12, a retainer 13 at one side of the big recessed hole 12 opposite to the slope 122. The shell 1 retainer 13 comprises an upright stop wall 131, an upright hook 132, and a retaining hole 133 defined between the upright stop wall 131 and the upright hook. The shell 1 two small recessed hole 14 symmetrically disposed adjacent to two opposite ends of the big recessed hole 12, two pairs of pivot holes 141 respectively and horizontally disposed in the small recesses 14 at two opposite sides, a front recessed hole 15 near an opposite long side of shell 1, and a mouse connector 16 within the front recessed hole 15 at one side for mounting an optical mouse 4. Each small stand 2 has two pivot pins 21 longitudinally aligned at the two opposite ends of one side thereof and respectively inserted into the pivot holes 141 in the small recessed hole 14. The big stand 3 has two first pivot pins 31 longitudinally aligned at the two opposite ends of one side thereof and respectively inserted into the pivot holes 121 in the big recessed hole 12, an opening 32 at one side in the middle corresponding to the retainer 13 of the keyboard shell 1, and two second pivot pins 321 bilaterally projecting into the opening 32 and respectively retained in the retaining hole 133 by the upright hook 132.

Referring to FIG. 2 again, when the big stand 3 and the small stands 2 are collapsed, they are respectively received within the big recessed hole 12 and the small recessed holes 14 in a flush manner. By permitting an operator to insert a hand into the sloping recess 122, the big stand 3 can be conveniently turned outwards from the big recessed hole 12 to support the keyboard shell 1 in a tilted position.

Referring to FIG. 3, the small stands 2 are turned out of the small recessed holes 14 to support the keyboard shell 1 in the first tilted position.

Referring to FIG. 4, the big stand 3 is turned out of the big recessed hole 12 to support the keyboard shell 1 in a second tilted position.

Figure 5:
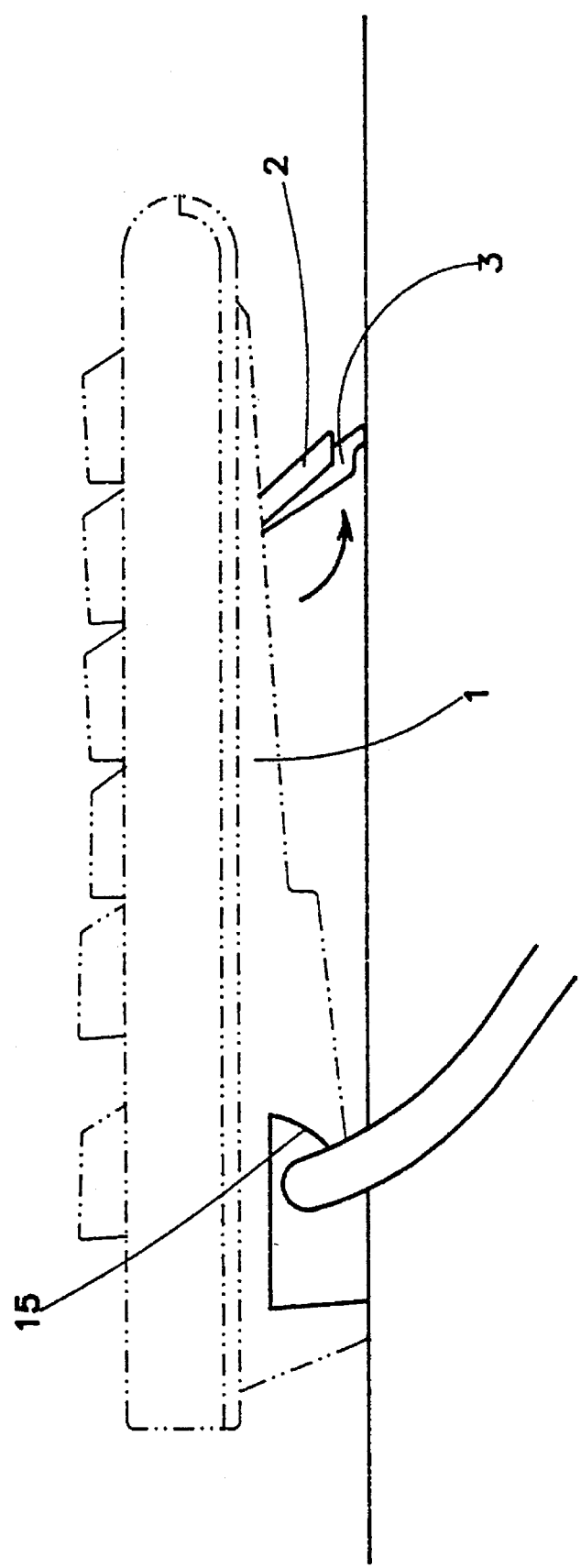
FIG. 5 is similar to FIG. 4 but showing the small stands suspended from the keyboard shell outside the small recessed holes.

Referring to FIG. 5, when the big stand 3 is turned out of the big recessed hole 12 to support the keyboard shell 1 in the second tilted position, the small stands 2 can be maintained in the extended out position suspended above the table top.

It is to be understood that the drawings are designed for purposes of illustration only, and are not intended as a definition of the limits and scope of the invention disclosed.

I claim:

1. A keyboard stand mounting structure comprising a keyboard shell, two small stands pivoted to a bottom side of said keyboard shell for supporting said keyboard shell in a first tilted position, and a big stand pivoted to the bottom side of said keyboard shell for supporting said keyboard shell in a second tilted position, wherein:

the bottom side of said keyboard shell comprises a big recessed hole longitudinally disposed near a first long side of said keyboard shell for receiving said big stand, two pivot holes respectively located at two opposite ends of said elongated recessed hole, a sloping recess extending away from and upwardly from one side of said big recessed hole, a retainer at one side of said big recessed hole opposite to said sloping recess, two small recessed holes symmetrically disposed adjacent to the two opposite ends of said big recessed hole, two pairs of pivot holes respectively and horizontally disposed in two opposite sides of said two small recessed holes, a front recessed hole near a second long side of said keyboard shell, and a mouse connector within said front recessed hole at one side for mounting an optical mouse;

said small stands each having two pivot pins longitudinally aligned at the two opposite ends of one side thereof and respectively inserted into the pivot holes in each of said two small recessed holes, said small stands being turned between a first position respectively received within said two small recessed holes in a flush manner and a second position to support said keyboard shell in said first tilted position;

said big stand having two first pivot pins respectively inserted into the two pivot holes in said big recessed hole, an opening in a middle of a side of said recessed hole corresponding to said retainer, and two second pivot pins bilaterally projecting into said opening, each of said two pivot pins respectively and turnably retained in a retaining hole on said retainer, said big stand being turned between a first position received within said big recessed hole in a flush manner and a second position to support said keyboard shell in said second tilted position.

* * * * *